Figure 2:
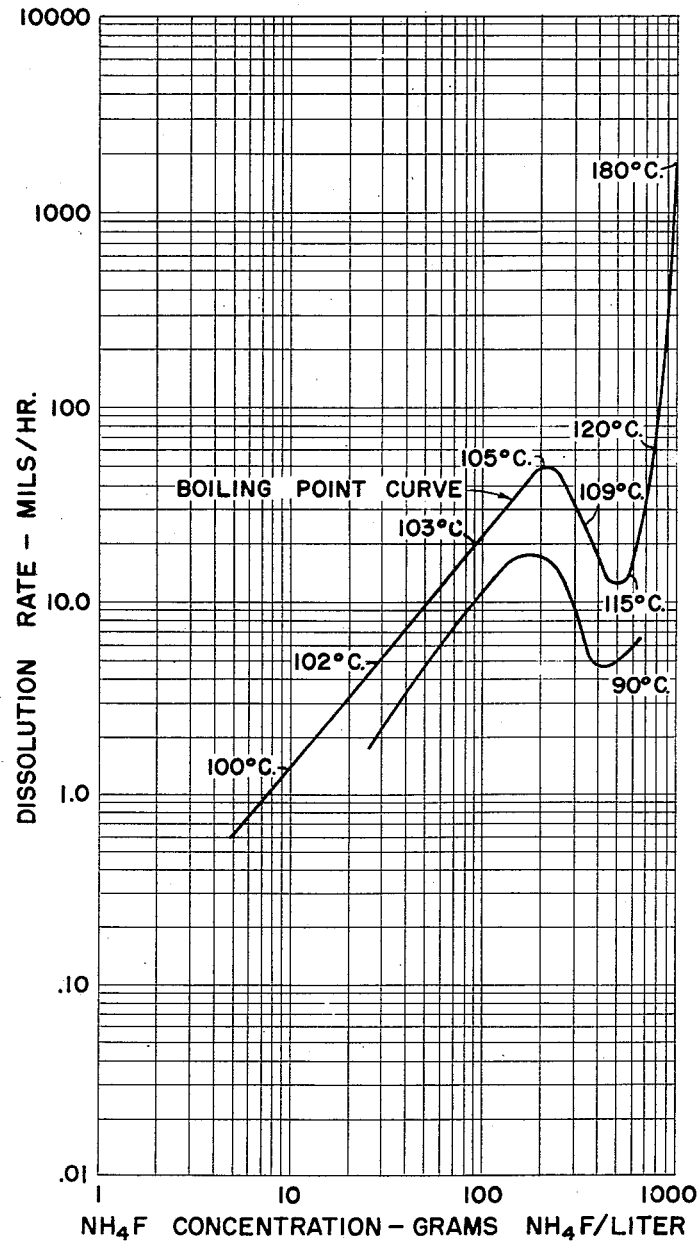

Fig. 2 DISSOLUTION OF ZIRCALOY 2 IN $NH_4F$

Figure 3:
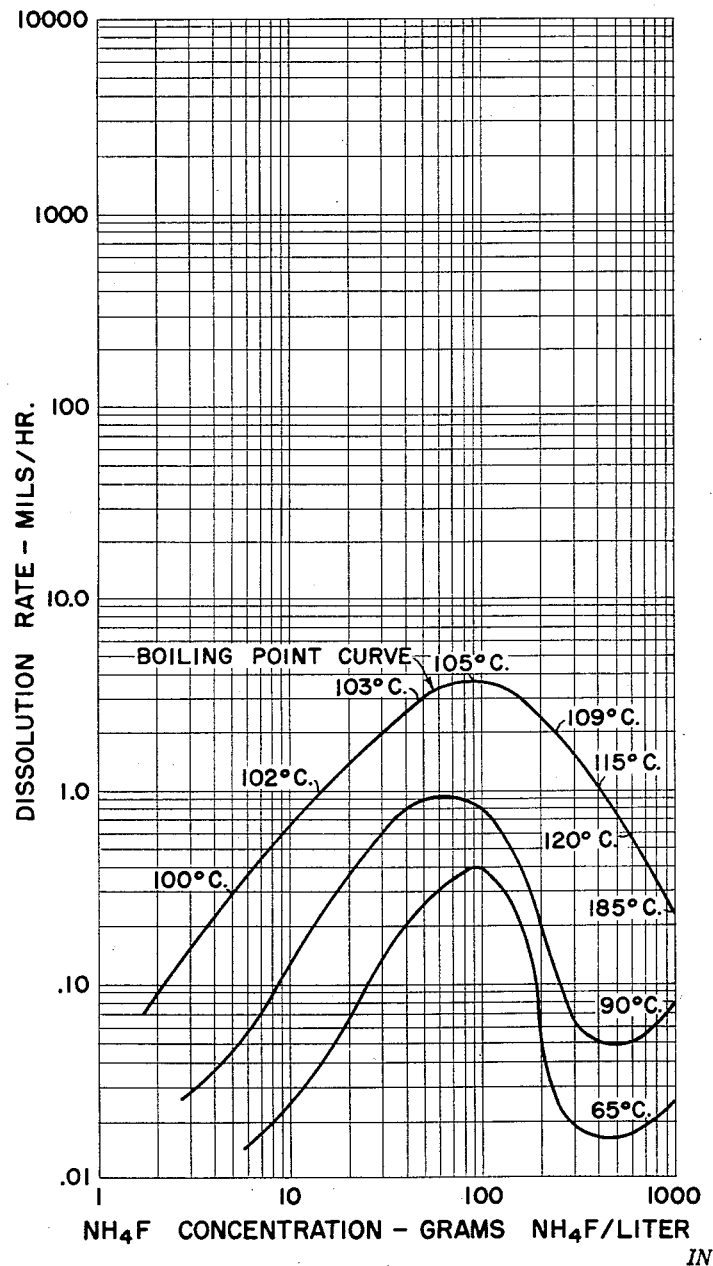

Fig. 3 DISSOLUTION OF TITANIUM IN NH₄F

Jan. 19, 1960

A. T. McCORD ET AL 2,921,836

PROCESS OF TREATING METALS

Filed April 24, 1956

5 Sheets-Sheet 4

INVENTORS
ANDREW T. McCORD
DONALD R. SPINK
BY
ATTORNEY

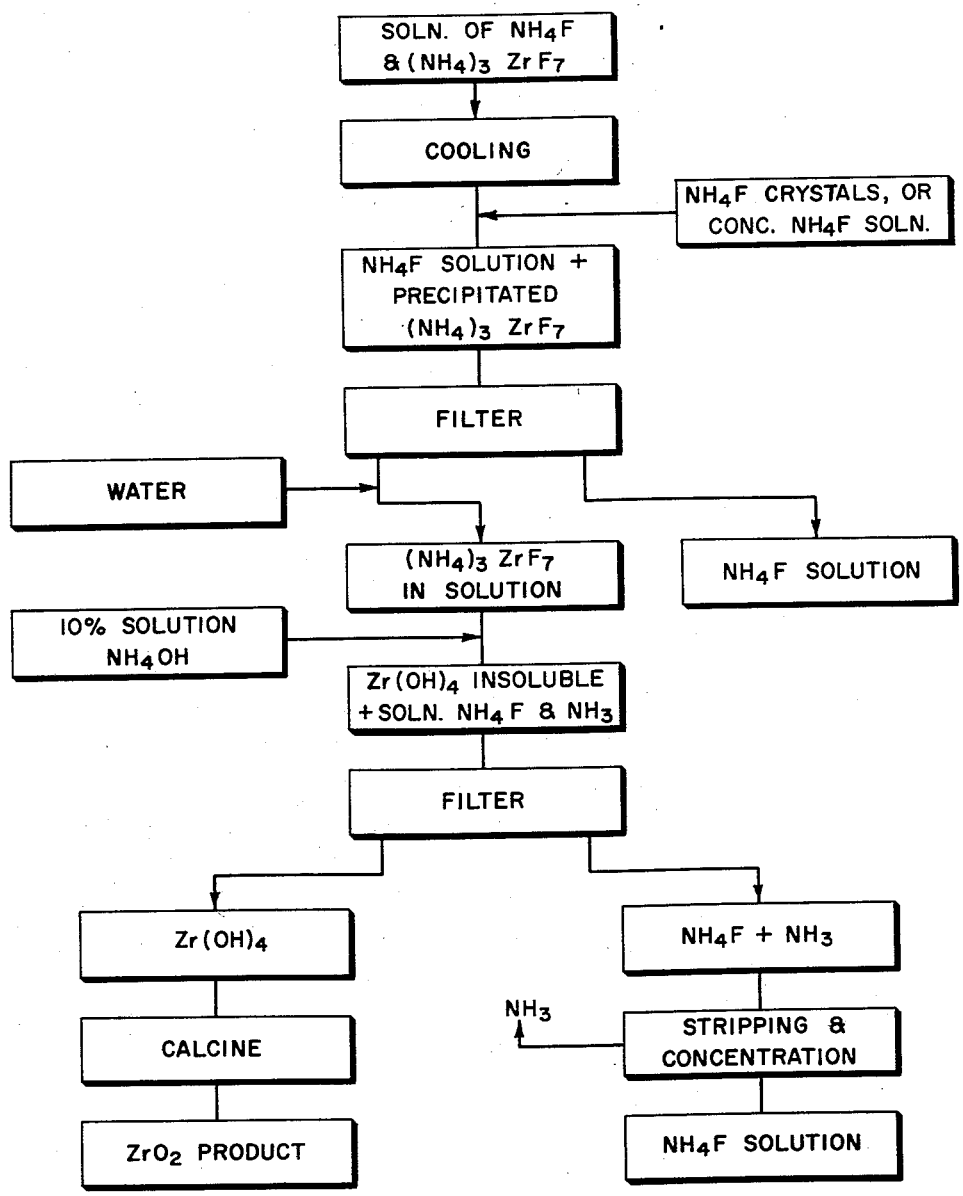

United States Patent Office 2,921,836
Patented Jan. 19, 1960

2,921,836

PROCESS OF TREATING METALS

Andrew T. McCord, Snyder, and Donald R. Spink, East Amherst, N.Y., assignors to The Carborundum Company, Niagara Falls, N.Y., a corporation of Delaware Application April 24, 1956, Serial No. 580,312

19 Claims. (Cl. 23—88)

This invention relates to a process of treating metals. More particularly, the invention pertains to the treatment of metals of Group IV A of Mendeleeff's Periodic Table such as titanium, zirconium and hafnium and their alloys, although it is now known to be applicable to certain other metals, including uranium.

This invention is based upon our discovery that the above-named metals, and especially the highly corrosion-resistant metals zirconium, hafnium and their alloys, can be easily and effectively dissolved in a substantially neutral solution of ammonium fluoride despite the fact that such solutions do not attack to any appreciable degree many metals such as iron, stainless steel and copper that are usually considered to be much more susceptible to corrosive influences. This fundamental concept forms the basis in practical application for various processes wherein it is desirable to convert such metals from one form or condition to another and more usable form.

For example, zirconium, hafnium, and their alloys are being used in ever increasing quantities for various structural and other purposes, especially in the field of atomic energy. During the processing of these metals to their finally fabricated form, considerable scrap is generated such as lathe turnings, milling chips, clippings, and massive waste such as pieces cut from ingots and billets, sheet, tube and rod stock and the like. It is estimated that out of every three to four pounds of original zirconium sponge produced only one pound ultimately appears in the final article, the remaining two to three pounds ending up in the form of various kinds of scrap material, some of which may be usable but a large percentage of which has been found to be in unusable condition. Many of the fabricating operations such as the cutting and machining of zirconium and hafnium metals cause intense local heating at the metal surface where the cutting or machining occurs and, due to the high affinity of such metals for oxygen and nitrogen at high temperatures, the resulting scrap material in the form of lathe turnings, chips and the like, is contaminated and embrittled and therefore no longer usable without first removing the embrittling contaminants. Prior to our invention, no completely satisfactory method had been devised for the recovery of this scrap material whereby it could be restored to usable form.

It is also often desirable to machine or otherwise remove metal from the surface of fabricated shapes of zirconium or hafnium or their alloys for various purposes. Again it is frequently desirable to convert such metals to a soluble form for the purpose of separating or recovering the metals from mixtures or combinations of the metals with other materials, or for the preparation of chemical compounds of the metals.

It is an object of the present invention to provide a process for the effective dissolution of highly corrosion-resistant metals such as titanium, zirconium, hafnium and their alloys.

It is a further object of the invention to provide an economical process for the recovery and restoration of scrap titanium, zirconium and hafnium metals and alloys to usable condition.

It is a still further object of the present invention to provide a method for the removal of metal from parts, or the entire surface of metal shapes composed of zirconium, hafnium and other metals of highly corrosion-resistant character.

It is a still further object of the present invention to provide a method for the separation and recovery of zirconium and hafnium and their alloys from other materials.

It is a still further object of the invention to provide a method for the conversion of zirconium and hafnium metals to soluble form.

Other objects and advantages accruing from the present invention will become apparent as the description proceeds.

We have found that substantially neutral ammonium fluoride solutions (pH range of 5 to 8, and preferably a pH range of 6 to 7) act as very effective solvents for such metals as titanium, zirconium and hafnium and their alloys, with the evolution of ammonia and hydrogen gas. Zirconium and its alloys are attacked and dissolved at a rapid rate by neutral solutions of ammonium fluoride, the dissolution being uniform on every surface. For example, a sheet of zirconium metal was uniformly reduced in thickness in one case from 0.035" to 0.004" with a plus or minus variation in thickness of 0.0005" in a matter of minutes. The concentration of the ammonium fluoride solution is not critical, very dilute solutions, even as low as 0.1% concentration (1 gram of ammonium fluoride per liter of solution) showing a definite ability to dissolve the metal although for more effective solution it is desired to use an ammonium fluoride solution having a concentration of 5 to over 50% (approximately 50 to 600 grams of ammonium fluoride per liter of solution) and preferably a 30% solution (approximately 300 grams of ammonium fluoride per liter of solution). Although solution occurs at room temperature it increases rapidly with increase of temperature up to the boiling point of the solution. The solution rate of the metal is therefore subject to close control and can be fixed at a predetermined rate, as desired, by changing the temperature and/or the concentration of solution, from a low rate of less than 0.1 mil of removed metal per minute to a high rate substantially in excess of 30 mils of metal removed per minute.

Figure 1:
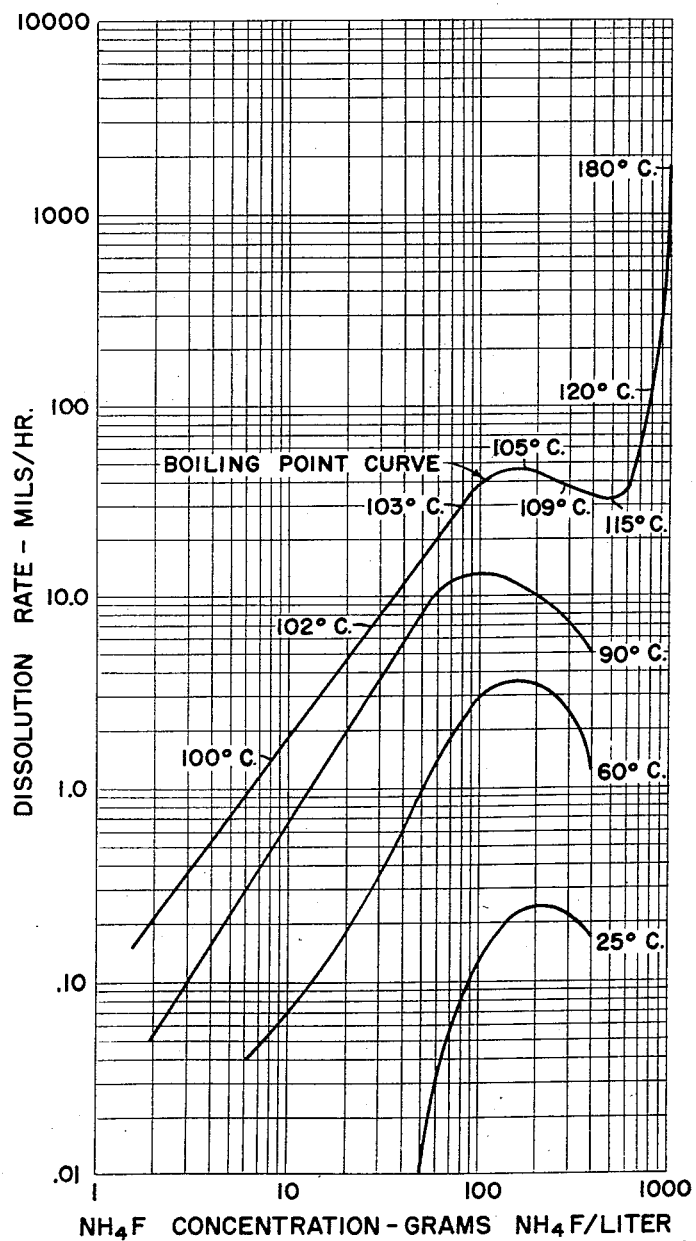

Figure 1 of the drawing presents a graph showing the effect of the concentration and temperature of the ammonium fluoride solution upon the rate of dissolution of zirconium metal. The uppermost curve of the graph is the boiling point curve and identifies the boiling points for ammonium fluoride solutions of several different concentrations. Log-log ordinates have been used in plotting the curves because of the extensive range of permissible concentration of the solution (1 to 1000 grams per liter) and the wide range of corrosion rates encompassed (0.01 to 1800 mils/hour).

Figure 2 of the drawing shows a similar set of dissolution rate curves for the solution of Zircaloy 2 which is an alloy of zirconium and tin containing about 1½% tin.

Figure 3 of the drawing shows the dissolution rate curves for the solution of titanium in neutral solutions of ammonium fluoride of different concentrations and at different temperatures. The graph shows that titanium is substantially more resistant to attack, showing a maximum dissolution rate of around 3.5 mils per hour at 100 grams per liter ammonium fluoride concentration at the boiling point temperature of 105° C. However, for many purposes this rate of solution is sufficiently effective to prove satisfactory.

The mechanism of the metal solution may be complex and it is not desired to be limited to any specific theory. Using the dissolution of ammonium fluoride upon zirconium metal as an example, it is believed that the solution of metal takes place in accordance with the following equation:

$$Zr + 7NH_4F \rightarrow (NH_4)_3ZrF_7 + 4NH_3 + 2H_2$$

Inasmuch as ammonia is evolved as a gas during the solution reaction, the pH of the solution remains virtually unchanged. However, when the reaction takes place at temperatures above 60° C. some dissociation of the ammonium fluoride occurs according to the following equation:

$$2NH_4F \rightarrow NH_4HF_2 + NH_3$$

The ammonium bifluoride ($NH_4HF_2$) is acidic and consequently the solution becomes slightly acidic despite the dissolution of metal. In other words, as the temperature of the solution is raised above normal room temperatures the pH of the solution is lowered slightly, the pH of the solution being between approximately 5 and 6 when the solution is near the boiling point for the specific concentration of solution being used. It is preferred to use a solution maintained between about 6 to 7 pH. When the ammonium fluoride solution dissociates to form ammonium bifluoride, the newly formed ammonium bifluoride attacks the metal, forming ammonium fluozirconate and ammonia in accordance with the following equation:

$$Zr + 3NH_4HF_2 \rightarrow (NH_4)_2ZrF_6 + NH_3 + 2H_2$$

In the presence of the ammonium fluoride, the above ammonium fluozirconate compound reacts as follows:

$$(NH_4)_2ZrF_6 + NH_4F \rightarrow (NH_4)_3ZrF_7$$

This latter ammonium fluozirconate compound is a crystalline material which crystallizes out of solution when the solution is concentrated and/or cooled, depending upon the concentration of the solution containing the fluozirconate. If a strong or concentrated ammonium fluoride solution is used, cooling alone will be sufficient to cause crystallization of the $(NH_4)_3ZrF_7$, but if dilute solutions are used the $(NH_4)_3ZrF_7$ does not crystallize out of solution upon cooling until either a much greater concentration of $(NH_4)_3ZrF_7$ is present in the ammonium fluoride solution or until the ammonium fluoride solution is increased in concentration and cooled. Concentration of the solution to crystallize out the ammonium fluozirconate can be readily accomplished by the addition of solid ammonium fluoride or a highly concentrated solution (preferably at least 40%) of ammonium fluoride to the solution. Increasing the ammonium fluoride concentration of the ammonium fluoride solution can also be accomplished by evaporation and cooling in order to crystallize the ammonium fluozirconate out of solution. In general, $(NH_4)_3ZrF_7$ is soluble in water and dilute $NH_4F$ solutions, the solubility increasing with increasing temperatures; $(NH_4)_3ZrF_7$ is practically insoluble in ammonium fluoride solutions containing in excess of 30% ammonium fluoride and at temperatures below 20° C. The solutions in general maintain a pH value near 7.

In the case of titanium more dilute solutions are effective in dissolving the metal than in the case of zirconium and its alloys, as shown in Figure 3 of the drawing. The soluble complex formed in the case of titanium is $(NH_4)_2TiF_6$ which is very soluble in water or $NH_4F$ solutions and cannot be easily crystallized out of solution except in very strong solutions at temperatures around 10° C. In this case, complete ammoniation of the $NH_4F$ solution is essential to remove the titanium which is dissolved.

The present process is ideally suited for the recovery of scrap titanium, zirconium, hafnium and their alloys. During the fabrication of parts from those metals considerable scrap is generated in the particulate form of lathe turnings, milling chips, clippings and in the form of massive waste such as large pieces cut from ingots and billets. The cutting operation usually causes intense local heating at the point or surface of the metal where the shearing or cutting action takes place, as a result of which the metal is contaminated not only with the machine and/or cutting oils used in the operation and with traces of metal from the cutting tool but, because of the high affinity of titanium, zirconium, hafnium, and their alloys for oxygen and nitrogen at high temperatures such gases are taken up by these metals. The organic contaminants such as machine oil and cutting oil can be easily removed in a degreasing operation, using an organic solvent such as acetone or perchlorethylene, and the iron or magnetic metal contaminants are readily removable with an electro or permanent magnet. The non-magnetic metallic contaminants can be removed by treatment of the scrap metal with a mineral acid such as hydrochloric, nitric or dilute sulfuric acid. However, no satisfactory method has heretofore been known for the effective and inexpensive removal of the oxygen and nitrogen contaminants. As far as we know, the only method heretofore available for the recovery of scrap zirconium and its restoration to usable form is that operated at the Bureau of Mines in Albany, Oregon, where the degreased scrap material is heated in an inert atmosphere with calcium metal and the oxygen and nitrogen contamination at the surface removed as calcium nitride and oxide. The treated scrap is then acid washed to remove lime salts and calcium and then reused by blending with high grade material.

It is essential that the oxygen and nitrogen be removed from the surface of the scrap metal in order to place the metal in suitable condition for further use. The scrap metal containing the oxygen and/or nitrogen contaminants, if remelted, produces a much harder metal than the original material from which it came. However, if the scrap metal after being degreased and freed of both magnetic and non-magnetic metallic contaminants when necessary, is treated in accordance with the present invention by immersion in a neutral ammonium fluoride solution to dissolve only the surface portion of the metal, separated from the fluoride solution, washed and dried, the treated metal is restored to usable condition. Upon removal of the metal from the ammonium fluoride solution the treated metal has a dark film or coating of material. This is removed by a flash rinsing of the metal in water followed by immersion of the metal in a dilute mineral acid solution such as a 1% to 5% solution of hydrochloric, nitric or sulfuric acid. It is preferred to carry out the drying of the metal in vacuum at a temperature around 75° C. as this tends to more completely remove residual water from the interstices of the metal. In fact, it has been found that metal that has been vacuum dried has a Brinell hardness about 5 units lower than the Brinell hardness of the same treated metal after ordinary drying. We have found that it is only necessary to remove about 6% by weight of the metal by solution in the neutral ammonium fluoride solution in order to restore the scrap material to acceptable condition for further use.

Figure 4:
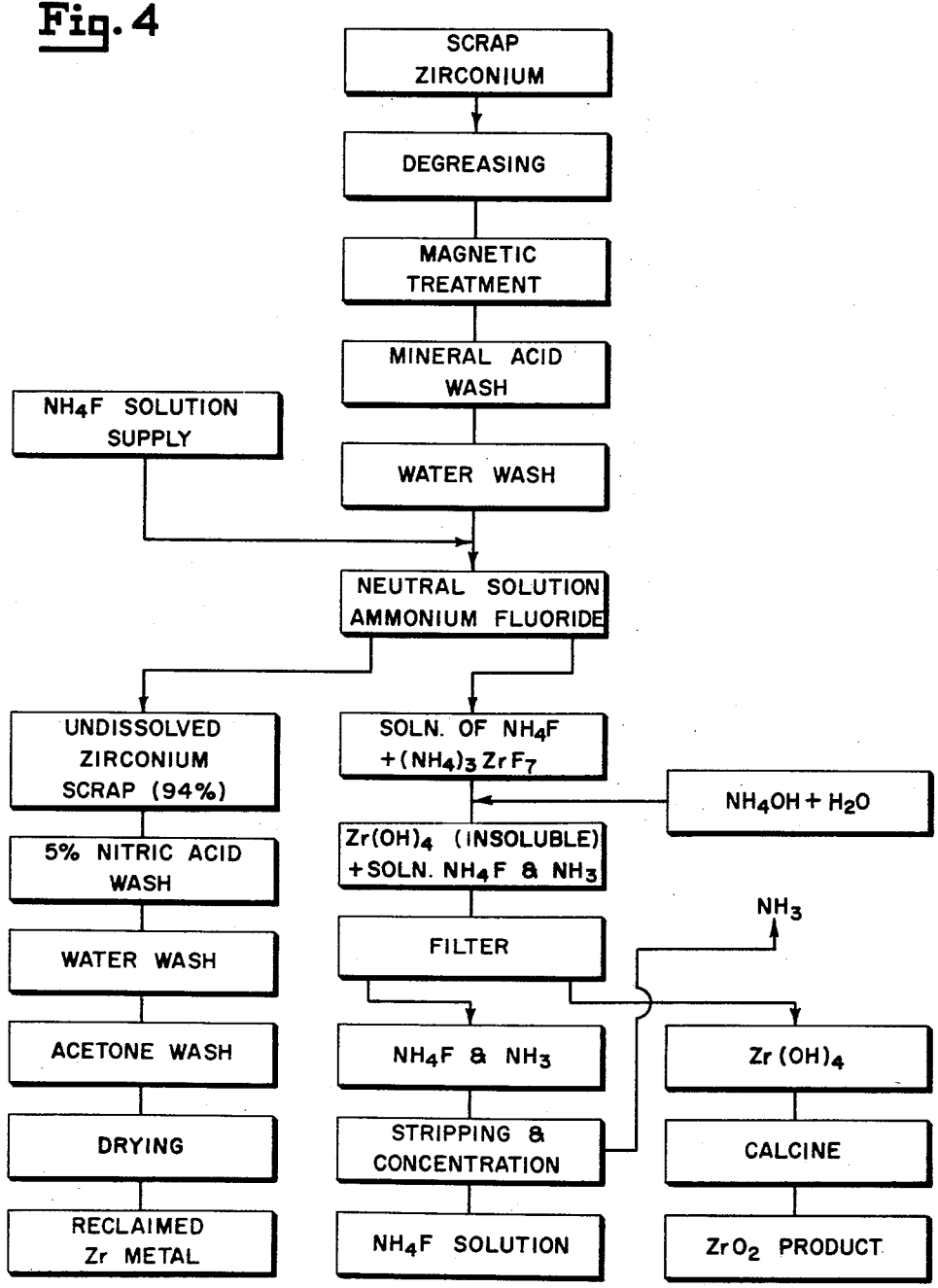

Figure 4 of the drawing presents in flow sheet form the herein described process for recovering scrap titanium, zirconium, hafnium, or their alloys, as applied to the recovery of scrap zirconium, and embodying the principles of the present invention. The scrap metal is first degreased by washing in acetone or perchlorethylene after which the material is subjected to a magnetic treatment to remove any iron and magnetic debris. The material is then treated in a mineral acid solution such as a 5% solution of nitric acid to remove or reduce non-magnetic metallic contaminants. Any one or more of these initial steps can be dispensed with, depending upon the particular source of the scrap and the nature of contaminating substances in the scrap. Having thoroughly cleaned the scrap metal from contaminants other than the oxygen and nitrogen, the scrap material is immersed in a substantially neutral solution of ammonium fluoride and left in the solution a sufficient length of time to dissolve off approximately 6% by weight of the metal from the surface of the scrap. The undissolved metal is removed from the ammonium fluoride solution and washed in 5% mineral acid, followed by a water wash, an acetone wash, and then dried. The reclaimed metal is then ready for re-use, such as melting in an arc furnace to form metal ingots.

After the ammonium fluoride solution has been in use for some time considerable quantities of zirconium in soluble form are contained in the solution.

As shown in flow sheet form in Figure 5, assuming a fairly dilute solution of ammonium fluoride has been used, by adding ammonium fluoride to the solution in the form of ammonium fluoride crystals or as a concentrated (40% or more) solution and cooling, a crystalline precipitate of ammonium zirconium fluoride of the formula $(NH_4)_3ZrF_7$ forms. These crystals are removed from the solution by filtration or centrifuging, freeing the ammonium fluoride solution for further use. Alternatively (referring again to Figure 4), the ammonium fluoride solution, after removal of the scrap zirconium, can be ammoniated to a pH of about 9 by the addition of ammonia and water to hydrolyze the ammonium zirconium fluoride contained in the solution. The resulting zirconium hydrate is insoluble and can be removed by filtration, dried and calcined to produce a usable zirconium oxide product. The mother liquid, after stripping the ammonia, and concentrating, is ready for further use.

When the ammonium fluoride solution is first cooled and concentrated by the addition of ammonium fluoride to throw down the ammonium zirconium fluoride in crystal form, these crystals are extracted from the ammonium fluoride solution which is then ready for further use in the treatment of metal. The crystalline ammonium zirconium fluoride is then dissolved in water to form a 12% solution, one volume of which is added to around 3 volumes of a 10% solution of ammonium hydroxide, thereby precipitating the zirconium as zirconium hydroxide which is removed from the solution, dried and calcined to form zirconium oxide. The ammonia is stripped from the ammonium fluoride solution, leaving it in condition, when concentrated, for further use.

The following examples will illustrate the manner in which the present invention is used for the recovery of scrap zirconium and its alloys.

Example I

A batch of scrap Zircaloy 2 zirconium alloy lathe turnings derived from the machining of an ingot having an average Brinell hardness (BHN) of 189 was obtained. The degreased turnings when melted in an arc furnace were found to yield a metal ingot having an average Brinell hardness (BHN) of 207 which is too high to render the metal satisfactory for most machining operations.

Three separate batches of such degreased turnings were then immersed in a substantially neutral ammonium fluoride solution of 30% concentration and left in the solution at room temperature a sufficient length of time to remove approximately 6% by weight of the metal. The turnings were removed from the solution, washed in 5% nitric acid, followed by a water wash, an acetone wash, and dried. The resulting scrap when arc melted to form solid metal ingots resulted in ingots having an average Brinell hardness (BHN) of 181, 185 and 185, respectively, for the three batches.

Example II

Using the same zirconium alloy scrap as used in Example I, and using substantially neutral ammonium fluoride solutions having concentrations ranging from 5% to over 50% (approximately 50 to over 600 grains ammonium fluoride per liter of solution), and at solution bath temperatures of 20° C. to 150° C., followed by rinses in dilute sulfuric, hydrochloric or nitric acid of approximately 5% strength, followed by water and acetone rinses, and vacuum drying, in every instance resulted in the obtaining of metal which when arc melted produced solid zirconium alloy ingots having Brinell hardness numbers less than 190.

Example III

Pure zirconium metal scrap having a Brinell hardness number of 174 and an oxygen contamination amounting to 1000 parts per million of oxygen was treated as described in Example I and the resulting scrap arc melted to form a zirconium metal ingot having a Brinell hardness number of 170 with the oxygen contamination reduced to 700 parts per million. It has been found as general experience in using the above process that the higher the hardness number of the initial scrap being treated, the more effective the treatment appears to be in reducing the hardness number.

While we have given specific examples for zirconium and Zircaloy 2, the identical procedures are applicable to hafnium and titanium and their alloys. For example, the process may be practised as a "solution machining" process in which metal is removed from a part or all of the surface of a fabricated metal article composed of zirconium, hafnium, titanium or their alloys. The process offers a highly satisfactory means of removing metal from such metal bodies because of the extreme uniformity of solution of the metal in the ammonium fluoride solution. If desired, certain machining operations such as the drilling of holes or cutting of recesses in a metal part can be accomplished by masking the metal article, except for the area to be "solution machined," with a coating of plastic or other protective material after which the article is immersed and the unprotected areas dissolved at a controlled rate in a neutral ammonium fluoride solution until the desired amount of metal has been dissolved away, after which the part is removed from the solution, washed and dried.

As is apparent from the previous description as well as Figures 4 and 5 of the drawing, the present process can be used as a method for making ammonium fluozirconate, and in turn, zirconium hydrate or zirconium oxide. In fact, the present process is adaptable wherever it may be found desirable to convert titanium, zirconium, hafnium, or their alloys to a soluble metal compound for the purpose of separating the selected metal from other materials or for other purposes.

While we have primarily described the present invention as it is applied to the processing or treatment of zirconium and its alloys the present process can also be carried out with hafnium and its alloys, titanium, and uranium.

Having described the invention it is desired to claim:

1. A process of treating a metal selected from the group consisting of titanium, zirconium, hafnium and their alloys which comprises immersing the selected metal in a substantially neutral solution consisting of ammonium fluoride and water and dissolving at least a portion of said metal therein.

2. A process of treating a metal selected from the group consisting of titanium, zirconium, hafnium and their alloys which comprises immersing the selected metal in a solution consisting of ammonium fluoride and water having a pH between 5 and 8 and dissolving at least a portion of said metal therein.

3. A process for the recovery of scrap metal selected from the group consisting of titanium, zirconium, hafnium and their alloys which comprises immersing the selected scrap metal in particulate form in a substantially neutral solution consisting of ammonium fluoride and water, removing the surface layer of metal from the particles of immersed metal by dissolution therein, separating the remaining undissolved metal from the solution, immersing the metal in a dilute mineral acid solution, removing the metal from the acid solution, and washing and drying said metal.

4. A process for the recovery of scrap metal according to claim 3 in which the mineral acid solution is a 1% to 5% solution of nitric acid.

5. A process for the recovery of scrap metal according to claim 3 in which the mineral acid solution is a 1% to 5% solution of hydrochloric acid.

6. A process for the recovery of scrap metal according to claim 3 in which the mineral acid solution is a 1% to 5% solution of sulfuric acid.

7. A process for the recovery of scrap metal selected from the group consisting of titanium, zirconium, hafnium and alloys predominantly thereof which comprises immersing the selected scrap metal in particulate form in a substantially neutral solution consisting of ammonium fluoride and water, removing the surface layer of metal from the particles of immersed metal by dissolution therein, separating the remaining undissolved metal from the solution, immersing the metal in a dilute mineral acid solution, removing the metal from the acid solution, and washing and drying said metal.

8. A process of treating a metal selected from the group consisting of titanium, zirconium, hafnium and their alloys which comprises immersing the selected metal in a substantially neutral solution consisting of ammonium fluoride and water and having an ammonium fluoride concentration of 5 to 50%, and dissolving at least a portion of said metal therein while maintaining the temperature of the solution between 20° and 115° C.

9. A process for the recovery of scrap metal selected from the group consisting of titanium, zirconium, hafnium, and their alloys which comprises degreasing the selected scrap metal by washing with an organic solvent to remove organic matter, separating iron and magnetic material from the metal by magnetic treatment, leaching the metal in dilute mineral acid to remove non-magnetic metallic contaminants, washing, immersing the washed and cleaned metal in a substantially neutral solution consisting of ammonium fluoride and water, removing the surface layer of metal from the particles of immersed metal by dissolution therein, separating the remaining undissolved metal from the solution, immersing the metal in a dilute mineral acid solution, removing the metal from the acid solution, and washing and drying said metal.

10. A process for the recovery of scrap metal according to claim 9 in which the drying is carried out under vacuum at a temperature of approximately 75° C.

11. A process of solution "machining" a metal body in which the metal of the metal body is selected from the group consisting of zirconium, hafnium, titanium and their alloys which comprises immersing the metal body in a nuetral solution consisting of ammonium fluoride and water, removing metal from at least a portion of the surface of said metal body by the solvent action of the ammonium fluoride solution thereon, removing the metal body from the solution, and washing and drying the metal body.

12. A process of making an ammonium metal fluoride selected from the group consisting of ammonium zirconium fluoride, ammonium hafnium fluoride, and ammonium titanium fluoride which comprises dissolving the one of said metals the fluoride of which is to be made in a substantially neutral solution consisting of ammonium fluoride and water, increasing the ammonium fluoride concentration of the ammonium fluoride solution to precipitate the ammonium metal fluoride in crystalline form, and separating said metal fluoride crystals from the ammonium fluoride solution, and drying.

13. A process according to claim 12 in which the metal is zirconium.

14. A process according to claim 12 in which the metal is hafnium.

15. A process according to claim 12 in which the metal is titanium.

16. A process of making ammonium metal fluoride selected from the group consisting of ammonium zirconium fluoride, ammonium hafnium fluoride, and ammonium titanium fluoride which comprises dissolving the one of said metals the fluoride of which is to be made in a substantially neutral solution consisting of ammonium fluoride and water, adding ammonium fluoride to precipitate the ammonium metal fluoride in crystalline form, and separating said metal fluoride crystals from the ammonium fluoride solution, and drying.

17. A process of treating metals according to claim 1 wherein the ammonium fluoride solution after a period of use is regenerated for further use by adding ammonium fluoride to the solution to increase the ammonium fluoride concentration of the solution and precipitate the ammonium metal fluoride contained in the solution, separating the precipitated ammonium metal fluoride crystals from the solution, and recovering the ammonium fluoride solution for further use.

18. A process of treating metals according to claim 1 wherein the ammonium fluoride solution after a period of use is regenerated for further use by cooling the ammonium fluoride solution and adding ammonium fluoride to the solution to increase the ammonium fluoride concentration of the solution and precipitate the ammonium metal fluoride contained in the solution, separating the precipitated ammonium metal fluoride crystals from the solution, and recovering the ammonium fluoride solution for further use.

19. A process of treating metals according to claim 1 wherein the ammonium fluoride solution after a period of use is regenerated for further use by adding ammonium fluoride to the solution to increase the ammonium fluoride concentration of the solution and precipitate the ammonium metal fluoride contained in the solution, separating the precipitated ammonium metal fluoride crystals from the solution, recovering the ammonium fluoride solution for further use, dissolving the ammonium metal fluoride crystals in water to form an aqueous solution, adding ammonia water to said aqueous solution to hydrolyze the metal fluoride thereof and form a solid metal hydrate, separating the metal hydrate from the resulting solution of ammonium fluoride and ammonia, and calcining the hydrate to form the metal oxide, stripping the ammonia from said solution, and concentrating the resulting ammonium fluoride solution for further use.

References Cited in the file of this patent

UNITED STATES PATENTS

| 2,507,314 | Mason | May 9, 1950 |
| 2,711,364 | Beach | June 21, 1955 |
| 2,711,389 | Beach et al. | June 21, 1955 |

OTHER REFERENCES

J. W. Mellor's "A Comprehensive Treatise on Inorganic and Theoretical Chemistry," vol. 2, 1922 ed., page 520, Longmans, Green and Co., N.Y.; vol. 7, 1927, pages 128, 139, 170 and 124.